United States Patent [19]
Mullarkey, Jr.

[11] Patent Number: 5,315,953
[45] Date of Patent: May 31, 1994

[54] PARKING AND DOOR STATUS INDICATOR FOR A GARAGE

[76] Inventor: Lawrence E. Mullarkey, Jr., 235 Q St., Springfield, Oreg. 97477

[21] Appl. No.: 52,745

[22] Filed: Apr. 27, 1993

[51] Int. Cl.$^5$ .............................................. B60Q 1/48
[52] U.S. Cl. .................................................... 116/28 R
[58] Field of Search ............... 116/28 R; 33/286, 645; 340/932.2; 362/32, 61, 80.1

[56] References Cited

U.S. PATENT DOCUMENTS

| | | | |
|---|---|---|---|
| 2,854,942 | 10/1958 | Ross | 116/28 R |
| 2,956,262 | 10/1960 | Bahr | 340/932.2 |
| 3,872,820 | 3/1975 | Hess | 116/28 R |
| 3,874,322 | 4/1975 | Brauer | 116/28 R |
| 4,433,636 | 2/1984 | Crouch | 116/28 R |
| 4,490,917 | 1/1985 | Pilling | 33/264 |

Primary Examiner—William A. Cuchlinski, Jr.
Assistant Examiner—W. Morris Worth
Attorney, Agent, or Firm—James D. Givnan, Jr.

[57] ABSTRACT

The disclosed apparatus is for installation in a garage and provides an indicator denoting garage door status as well as the desired parked location of an automobile. A support assembly is attachable to the garage structure, and includes an elongate member along which a cord is entrained. One end of the cord carries the visual indicator in the driver's vision while the remaining end of the cord terminates at the upper end of the garage door. A pair of guides for the cord are housed in the elongate member and enable adjustment of indicator position and of the amount of slack, if any, in the cord. A segment of the cord is elastic. A bracket of the support assembly includes an angular portion for locating the indicator within the driver's field of vision.

7 Claims, 1 Drawing Sheet

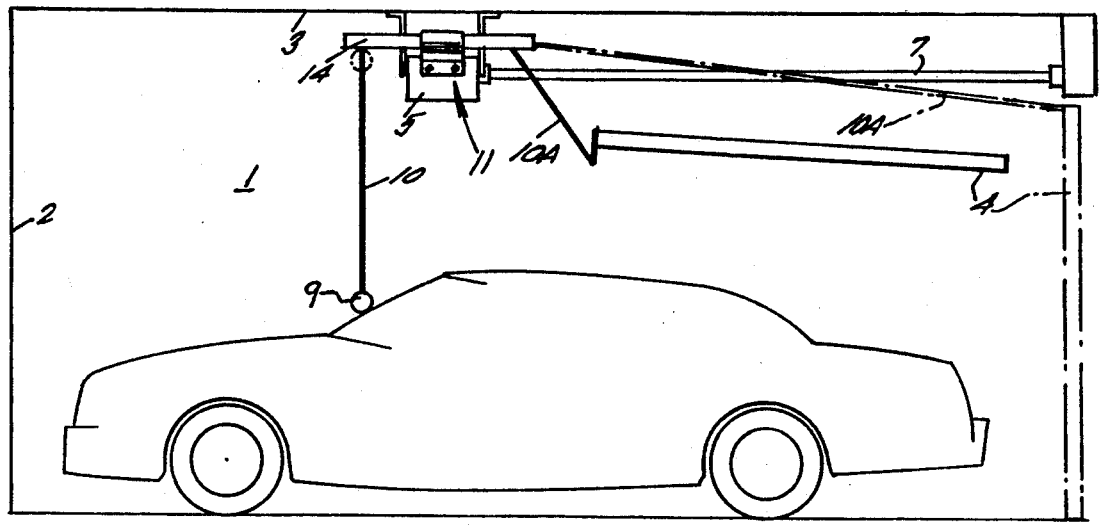
Fig. 1
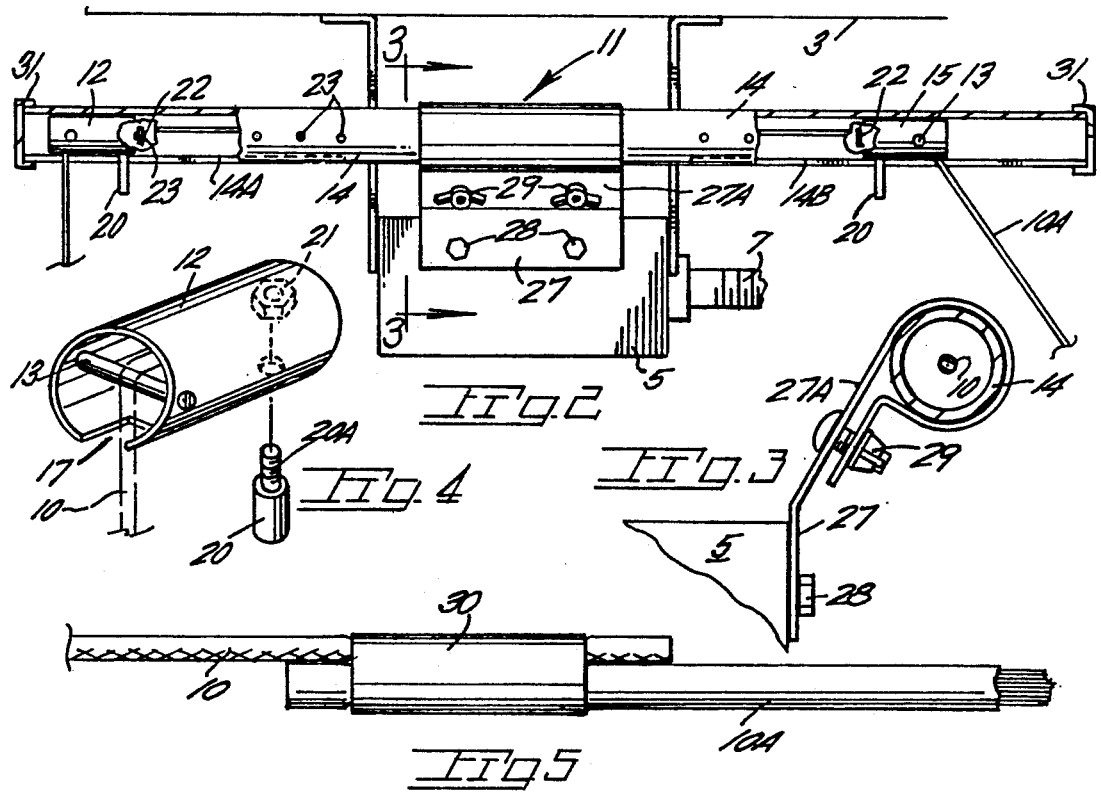
Fig. 2
Fig. 3
Fig. 4
Fig. 5

PARKING AND DOOR STATUS INDICATOR FOR A GARAGE

BACKGROUND OF THE INVENTION

The present invention pertains generally to that class of devices for indicating the parked location of an automobile within a garage.

In the prior art are devices suspended from a garage ceiling or other elevated support which depend into the path of a garaged automobile to provide an indication to the driver that a vehicle has reached an optimum parking position. Such devices include a ball or like article suspended on a flexible cord. Examples of such parking aids are found in U.S. Pat. Nos. 4,490,917; 2,854,942; 2,956,262 and 4,433,636. U.S. Pat. No. 3,874,322 is of interest in that it discloses a ball-like indicator suspended from an overhead support and serves to provide an indication to the driver for purposes of parking a vehicle in a garage. The indicator is suspended on the line that is retrieved or payed out in response to the closing and opening of an overhead garage door. In one embodiment, a pair of lines are wound on drums of different diameters in the travel of a garage door and the vertical distance the indicator moves during such door travel. The prior art parking indicator devices do not lend themselves to convenient periodic repositioning when a different auto is to be parked in a garage.

SUMMARY OF THE PRESENT INVENTION

The present invention is embodied within an apparatus for indicating the optimum parked position of a car within a garage and the closed or open status of the garage door.

A cord of the present invention is coupled to a garage door and during opening lowers a parking indicator into the field of vision of the driver and proximate the auto windshield to indicate the forward limit of travel of the vehicle. The cord passes through a support assembly adjacent to the garage ceiling which assembly includes a cord guide which is readily positionable fore and aft in the garage to position the parking indicator with respect to the end of the garage. The cord additionally passes through the support assembly with an elastic segment terminating at the upper edge of garage door. A guide of the support assembly may be positioned therealong to at all times retain the cord elevated and out of contact with the vehicle or a person when the garage is vacant. The present invention utilizes a cord having an elastic segment to avoid a sagging length of cord coming into accidental contact with a vehicle or person. The support assembly may be held in place by a bracket secured to a garage component such as the motor housing of a door opener apparatus.

Important objectives of the present indicator apparatus include the provision of a combination parking indicator to signal an automobile driver when a car is at its optimum or desired parking location within a garage and additionally, indicating to the driver the open or closed status of the garage door; the provision of an indicator apparatus including a support assembly including an elongate member provided with an adjustable cord guide to facilitate positioning of the cord and the parking indicator attached thereto with respect to the end of a garage; the provision of an indicator apparatus having a carrier over which a cord is entrained with the carrier being positionable to take up slack in the cord to prevent accidental contact of same with an auto or person; the provision of an indicator apparatus, including a cord for suspending an indicator article into the path of the vehicle, with the cord having an elastic segment to assure the cord being elevated toward the ceiling of the garage when the door is in a closed position.

BRIEF DESCRIPTION OF THE DRAWINGS

In the accompanying drawings:

FIG. 1 is an elevational view of a garage area with the present indicator apparatus in place;

FIG. 2 is an enlarged elevational view of the support assembly of the present indicator apparatus with fragments broken away for purposes of illustration;

FIG. 3 is a vertical sectional view taken along line 3—3 of FIG. 2; and

FIG. 4 is a perspective view of a cord guide removed from the support assembly of the present invention; and FIG. 5 is a segment of the cord used in the present apparatus disclosing means for coupling segments of cord used in the present apparatus.

DETAILED DESCRIPTION OF THE PREFERRED EMBODIMENT

This continuing attention to the drawings, wherein applied reference numerals indicate parts similarly hereinafter identified, the reference numeral 1 indicates a garage area with the garage having an end wall 2, ceiling 3, and a door 4. Door 4 is of the overhead type entrained on side rails (not shown) with opening and closing movement imparted to the door by a motor housing 5. During door movement the motor in housing 5 drives a screw shaft 7 in both directions to advance and return a traveler unit thereon coupled to door 4 by linkage (not shown). The foregoing description of a garage with overhead door is intended to be typical as it is understood the wide variety of door opener mechanisms exist as well as a variety of door biasing spring arrangements.

The present invention includes a line or cord 10 which terminates at one end an attachement to a suspended parking indicator 9, positionable into the driver's field of vision to indicate the optimum parked position of an automobile by the indicator's proximity to a portion of the auto. Cord 10 is entrained over a forward guide 12, positionably carried by a tubular member 14 of a support assembly 11. Line or cord 10 passes over a pin 13 and then extends along tubular member 14 and then through a rear guide 15 at the rearward or door facing end of tubular member 14. Cord 10 continues downwardly from tubular member 14 for termination in attachment to the upper portion of door 4. The guides 12 and 15 are preferably of the same configuration, and accordingly the following description of guide 12 is equally applicable to guide 15. A pin 13 extends across guide 12 to support cord 10 prior to its downward run through a notched area 17 of the guide. A finger grip 20 is attached to the guide by a threaded portion 20A being engageable with a nut 21 located within the guide. Tubular member 14 is slotted at 14A–14B to permit passage of the cord. A lock 22 may be in the form of a cotter key, which when inserted through a hole 23 in tubular member 14 serves to lock the guides 12, 15 against inward displacement. Axial adjustment of guide 12 and guide 15 is by grasping of finger grip 20 and manually positioning same subsequent to removal of cotter key lock 22. The pair of slots 14A–14B in tubular member 14 permits cord passage in an inclined direction.

Support assembly 11 additionally includes a bracket at 27, which is conveniently attachable to motor housing 5 by fasteners 28. Bracket 27 includes a fastener assemblies 29 which enables clamping engagement with a segment of tubular member 14 when in the desired axially adjusted position. Further the bracket 27 is preferably angulated with an offset or angular portion 27A to position tubular member 14 and hence indicator 11 in the forward field of vision of the driver to ensure observance of the indicator.

In FIG. 5, a segment of cord at 10A is shown, including a ferrule at 30 which serves to join cord segments at 10 and 10A. Segment 10A is of cord material commonly termed bungee cord and terminates at its remaining end in attachment to the garage door. Segment 10A may be three feet or so in length.

If desired, end caps at 31 are fitted on the ends of tubular member 14 and serve to confine the guides 12 and 15 against separation.

In use, the indicator may be installed in a convenient manner on the door opener motor housing 5 which typically is equipped with flanges for installation purposes. The bracket 27 permits axial adjustment of elongate member 14 with guide 12 allowing for precise positioning of indicator 11 for each installation. The grips 20 on the front and rear guides permit ready adjustment of the guides with the latter guide positioned to minimize slack in the cord. To avoid excessive cord length to accommodate a range of vehicle sizes and different parking locations and sagging of cord 10, when the door is raised, at least a portion of the cord is preferably elastic to permit stretching of the cord when the door is closed.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. An indicator apparatus for installation in a garage structure having a forward end and an overhead door to indicate desired automobile parking locations for a range of different sized automobiles and also to indicate garage door position, said apparatus comprising, an indicator having a raised position and a lowered position and when in said lowered position being in the field of vision of the automobile driver to provide a reference point, a support assembly including mounting means for attaching said support assembly to said garage structure and an elongate tubular member carried by said mounting means, a cord having said indicator at one end thereof and carried by said elongate tubular member, a segment of said cord being of an elastic nature to avoid excessive sagging of the cord when the overhead door is raised, a remaining end of said cord attached to the overhead door, and said cord being tensioned and said segment stretched when the door is in a closed position to elevate the indicator to the raised position out of the field of vision of the driver to indicate the door is closed.

2. The indicator apparatus claimed in claim 1 wherein said elongate tubular member includes a guide through which said cord is entrained.

3. The indicator apparatus claimed in claim 2 wherein said guide is slideably positionable within said elongate tubular member, lock means adjustably engagable with said elongate tubular member to permit locking said guide in place along the tubular member to position the indicator relative to the forward end of the garage.

4. The indicator apparatus claimed in claim 1 wherein said garage structure includes a motorized door opener having a motor housing, said mounting means includes a bracket, means coupling the bracket to the motor housing of the door opener of the garage structure.

5. The indicator apparatus claimed in claim 1 wherein said support assembly includes a bracket for clamped engagement with said elongate tubular member to render the elongate tubular member axially positionable relative said mounting means.

6. The indicator apparatus claimed in claim 1 wherein said elongate tubular member includes a forward guide and a rearward guide adjustably mounted in said elongate member and lock means adjustably enagageable with said elongate member, said cord passing through said elongate member and entrained within said forward guide and said rearward guide, said forward guide being slideably positionable along said elongate member to facilitate positioning said indicator lengthwise of the garage.

7. The indicator apparatus claimed in claim 1 wherein said mounting means includes a bracket having an angulated portion to laterally position the elongate tubular member carried thereby toward the field of vision of the automobile driver.

* * * * *